United States Patent [19]

Pettit et al.

[11] Patent Number: 4,671,560

[45] Date of Patent: Jun. 9, 1987

[54] WINDOW BOOT END SECUREMENT

[76] Inventors: Thomas L. Pettit, 21420 118th Ave. East, Graham, Wash. 98338; Clyde L. Perkins, 31616 44th Ave. South, Auburn, Wash. 98001

[21] Appl. No.: 879,354

[22] Filed: Jun. 27, 1986

[51] Int. Cl.⁴ .............................................. B60P 3/32
[52] U.S. Cl. ................................................... 296/166
[58] Field of Search ...................... 296/166, 164, 156; 49/475, 485

[56] References Cited

U.S. PATENT DOCUMENTS

| | | | |
|---|---|---|---|
| 3,321,234 | 5/1967 | Harrell et al. | 296/166 |
| 3,625,560 | 12/1969 | Bjork | 296/166 |
| 3,837,700 | 9/1974 | Van Slyke | 296/166 |
| 3,844,603 | 10/1974 | Bjork et al. | 296/166 |
| 3,853,348 | 12/1974 | Bjork et al. | 296/166 |
| 4,157,201 | 6/1979 | Collins et al. | 296/156 |
| 4,222,605 | 9/1980 | Engelhard | 296/166 |
| 4,279,426 | 7/1981 | Flack, Jr. | 296/166 |
| 4,294,485 | 10/1981 | Engelhard | 296/166 |
| 4,299,422 | 11/1981 | Pettit | 296/166 |
| 4,492,384 | 1/1985 | Herschelman | 296/166 |
| 4,616,871 | 10/1986 | Pettit | 296/166 |

Primary Examiner—Robert R. Song
Attorney, Agent, or Firm—Quaintance, Murphy & Presta

[57] ABSTRACT

For use with a window boot joining in sealing relationship the aligned window openings in a camper, cap or canopy truck combination, the window boot having a semi-rigid compressible end construction, a frame assembly mounted about at least one of the window openings, preferably the camper window on the exterior thereof, which receives the window boot end in sealing relationship so that the otherwise conventional sliding windows of the window opening may be opened and closed with the boot end in place. The frame may be placed over an existing window opening or be made an integral part of the window. A pair of opposed, inverted J-shaped channels receive the boot end which includes opposed, telescopic, U-shaped legs spring urged to an expanded configuration.

9 Claims, 12 Drawing Figures

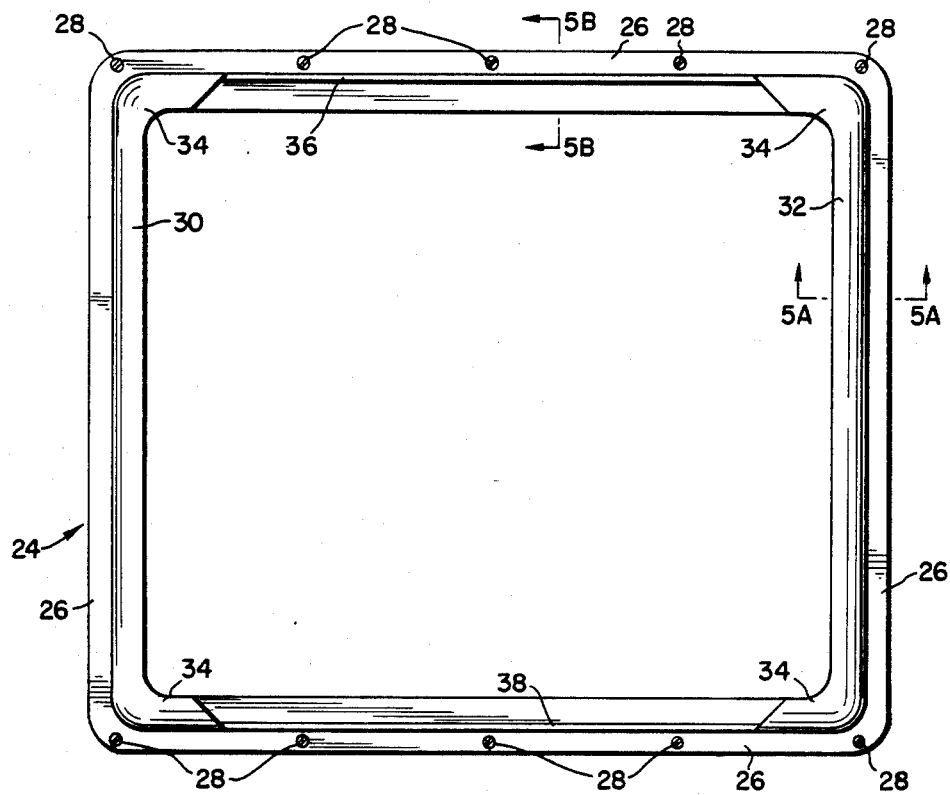

WINDOW BOOT END SECUREMENT

BACKGROUND OF THE INVENTION

This invention relates generally to window boots for interconnecting adjacent window structures of a truck and camper, cap or canopy combination and more particularly to a frame structure for retaining the semi-rigid end of a window boot or tunnel in place and in sealing relationship with the periphery of one of the window openings, preferably that of the camper, cap or canopy.

A most popular vehicle, currently, is an open bed truck carrying a camper, cap or canopy on the bed. Commonly, such carried structures include a forward window which is in approximate registry or alignment with the rear window on the cab of the truck. It is desirable to interconnect these window openings with a seal or tunnel structure which is in sealing relationship with the window openings of the cab and camper combination so that weather, dirt and debris are excluded from the camper and cab. Also, free communication is provided through this ready access opening. Furthermore, it is desirable to have a window boot structure which is easily installed and removed without being permanently attached to either the cap or the carried camper. Several such boots are known, a more recent one being that disclosed in my prior U.S. Pat. No. 4,616,871, issued Oct. 14, 1986 and entitled "SNAP-IN WINDOW BOOT FOR TRUCK-CAMPER COMBINATION AND THE LIKE."

This prior invention of mine includes a flexible tunnel and ends in the form of semi-rigid, spring loaded members which are compressed together for insertion through the adjacent windows of a truck and camper combination and then expand so that the tunnel ends are retained behind the windows. While this invention has found ready acceptance in the marketplace, it has been determined that it is desirable to have at least one of the windows free of any structure inserted through it. More particularly, each such window of a truck-camper combination includes a central aperture closed by a pair of sliding windows which are moved apart in order to provide an open window. This invention is concerned with providing a frame structure about this window opening for retaining the semi-rigid end member of a window boot end in place, in sealing relationship yet permitting the otherwise conventional sliding window members to be opened and closed without interference.

There have been prior art attempts to provide such a window boot which will leave the sliding or slider window of the truck or camper operable even when the window boot is in place. Engelhard U.S. Pat. No. 4,222,605 and its continuation-in-part U.S. Pat. No. 4,294,485 show a tunnel boot having end portions which are thickened into lips and the lips are pressed into channels about the peripheries of the respective camper and cab windows. Bjork et al U.S. Pat. No. 3,853,348 discloses a boot frame formed of two metal sections which are snap fit into a channel surrounding the rear slider window of the truck cab so that the window can still be opened and closed.

The following prior art patents are somewhat less relevant to the instantly disclosed and claimed invention. Bjork U.S. Pat. No. 3,625,560 shows a boot permanently attached to a camper or canopy and having a free end which fits into the frame of the rear window on the truck cab. Van Slyke U.S. Pat. No. 3,837,700 (FIG. 4) discloses a series of pin projections which are provided about the camper or canopy window to facilitate installation of a seal and maintain the alignment of the seal with the truck cab and camper window. Bjork et al U.S. Pat. No. 3,844,603 illustrates a gasket fitted around a truck cab window opening for seating a frame to which the end of the window boot is adhesively sealed. Flack, Jr. U.S. Pat. No. 4,279,426 shows a window boot tunnel having coil wire ends which are snap fit behind the windows of the truck cab and camper; when installed the windows cannot be closed. Pettit U.S. Pat. No. 4,299,422 shows two toroidal chambers which form tunnel ends that are snap fit behind window openings of the truck cab and camper. The windows cannot be closed or operated with this boot installed.

The following prior U.S. patents are a bit further removed from the invention at hand. Collins U.S. Pat. No. 4,157,201 discloses a permanent door installed in the rear of a truck cab and its frame includes a flexible seal which is connected to an opening in the front wall of a camper. Windows are then installed on either side of the door. This invention requires rather major surgery to the rear of the truck cab. Finally, Herschelman U.S. Pat. No. 4,492,384 shows a truck cab-sleeper boot assembly permanently riveted within the adjacent openings between the cab and sleeper.

The prior art does not disclose a frame structure for receiving the spring loaded, semi-rigid end of a window boot assembly, the frame receiving the boot end in sealing relationship about a window opening closed by sliding panes, the frame including opposed channel members with an upper eave or ridge and a lower shelf. The invention may be provided in kit form for placement over an already existing camper window or, to satisfy the needs of the original equipment market, may be provided as an integral part of an otherwise conventional cab window having sliding glass panes in the center.

SUMMARY OF THE INVENTION

Accordingly, it is a principal object of the invention to provide a frame structure for securing a semi-rigid boot end about the window opening of a truck cab or camper in sealing relationship therewith, the frame assembly including a pair of opposed channels having elongate openings therein which face one another and receive the boot end.

It is another object of the invention to provide a window boot end securement which secures the boot end in sealing relationship about the opening of the window of a truck cab or camper and yet permits the otherwise conventional slider window to be opened and closed without interference.

It is a further object of the invention to provide a window boot end securement in the form of a frame having opposed channels and with an upper lane or hood and a lower shelf interconnecting the channel ends and providing a weather seal between the frame and the boot end.

It is still a further object of the invention to provide a window boot end securement in the form of a generally quadrilaterally shaped frame of one-piece construction which may be an extrusion, stamping or casting.

It is yet another object of the invention to provide a window boot end securement in the form of a frame, integral with an otherwise conventional camper or cab slider window as an item of original equipment manufacture.

It is yet a further object of the invention to provide an indefinite length of stock material having a cross-section configuration in the form of an inverse J, the material being used for the construction of opposed channels for retaining an end of a sealing boot which is installed between adjacent window openings in a truck cab and camper, cap or canopy combination.

Another object of the invention is to provide the combination of a window boot and frame, the boot being a tunnel of relatively flexible material terminating in opposed ends, at least one end being a semi-rigid construction of interfitted, U-shaped members, spring urged to an expanded state and a frame assembly about the periphery of an otherwise conventional slider window, the frame including a pair of opposed channels for receiving the semi-rigid end of the window boot.

BRIEF DESCRIPTION OF THE DRAWINGS

Other and more complete objects and advantages of this invention will become readily apparent by reference to the following detailed specification and drawings in which:

FIG. 3 is a plan view of the end securement frame of FIG. 2 drawn to an enlarged scale;

FIG. 4 is an end elevation view of the end securement frame illustrated in FIG. 3;

FIGS. 5A and 5B are sectional views taken along Lines 5A—5A and 5B—5B of FIG. 3, respectively;

DESCRIPTION OF THE PREFERRED EMBODIMENTS

Figure 1:
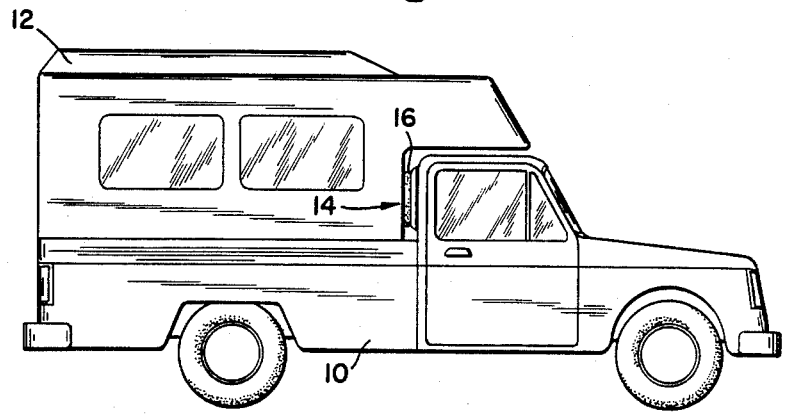
FIG. 1 is a side, elevation view of a truck and camper combination with a boot having semi-rigid expandable ends as previously described installed in place.

Referring now to the drawings by reference character, FIG. 1 illustrates a truck and camper combination including an open bed truck 10 with a camper 12 mounted in the bed of the truck 10. A window boot is generally identified at 14 and is shown installed in place between aligned window openings of the truck and camper combination. This boot includes a central, inflatable chamber at 16. Relevant parts of the window boot 14 are discussed herein below. A more complete description of this window boot appears in my prior U.S. Pat. No. 4,616,871 issued Oct. 14, 1986 and entitled "SNAP-IN WINDOW BOOT FOR TRUCK-CAMPER COMBINATION AND THE LIKE." Preferably, the end securement frame of this invention will be used with the otherwise conventional slider window of the camper of the truck-camper combination. However, if desired, it may be used over the otherwise conventional slider window installed in the rear of the truck cab. Such a slider window assembly is indicated at 18 in FIG. 2 and includes panes 20,22 which are slidably mounted and are opened and closed by being urged apart and together respectively. The kit form end securement frame embodiment of this invention is indicated at 24 in FIG. 2. This frame 24 may be installed over and about the window opening of the slider window 18 of an already existing camper or truck. Frame 24 may be constructed in one-piece fashion and may be an extrusion, stamping or casting. Frame 24 includes a peripheral lip 26, the upper and lower portions of which are attached to the body of the camper or cab by any suitable conventional means such as screws 28, as is illustrated in FIG. 3. Frame 24 is provided in various sizes so as to have dimensions that fit the several models and varieties of slider windows on the market.

As shown in FIGS. 3 and 5A, the vertical, side portions of Frame 24 are channels 30,32 which have openings facing one another. In cross-section, each channel 30,32 is in the form an inverted J, as is shown in FIG. 5A. Each end of each channel 30,32 includes a short extension or segment 34 which serves to secure the corner of a window boot. A flat eave or ledge joins the upper segments 34 and a lower shelf 38 joins the lower segments 34. Ledge 36 and shelf 38 provide a weather seal between the upper and lower ends of a window boot end installed in Frame 24.

Figure 2:
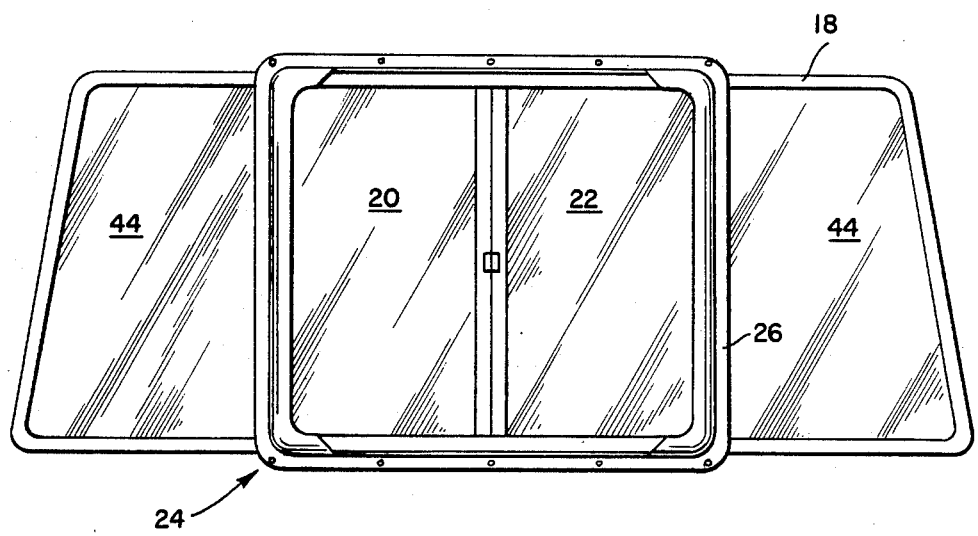
FIG. 2 is an elevation view of an otherwise conventional slider window having one embodiment of the end securement of this invention installed in place over the slider window opening.

As shown in FIG. 5A, the base of channel 30 is formed as a flat web 40 which is seated against the conventional U-shaped edge molding 42 of the fixed glass pane 44 of slider window 18. U-shaped molding 42 is partially indicated in FIG. 5A and fixed glass 44 is illustrated in FIG. 2. The left-hand construction, beneath channel 30, is configured similarly. If desired, a seal, such as weather stripping or adhesive, may be inserted between the webs beneath channels 30 and 32 and the U-shaped edge moldings for the fixed glass panes of slider window 18 (not shown). Similar sealing means (not shown) may be provided between the upper and lower lips 26 and the surface of the camper or truck upon which frame 24 is installed.

Installation of a window boot end within frame 24 will be discussed below.

Figure 6:
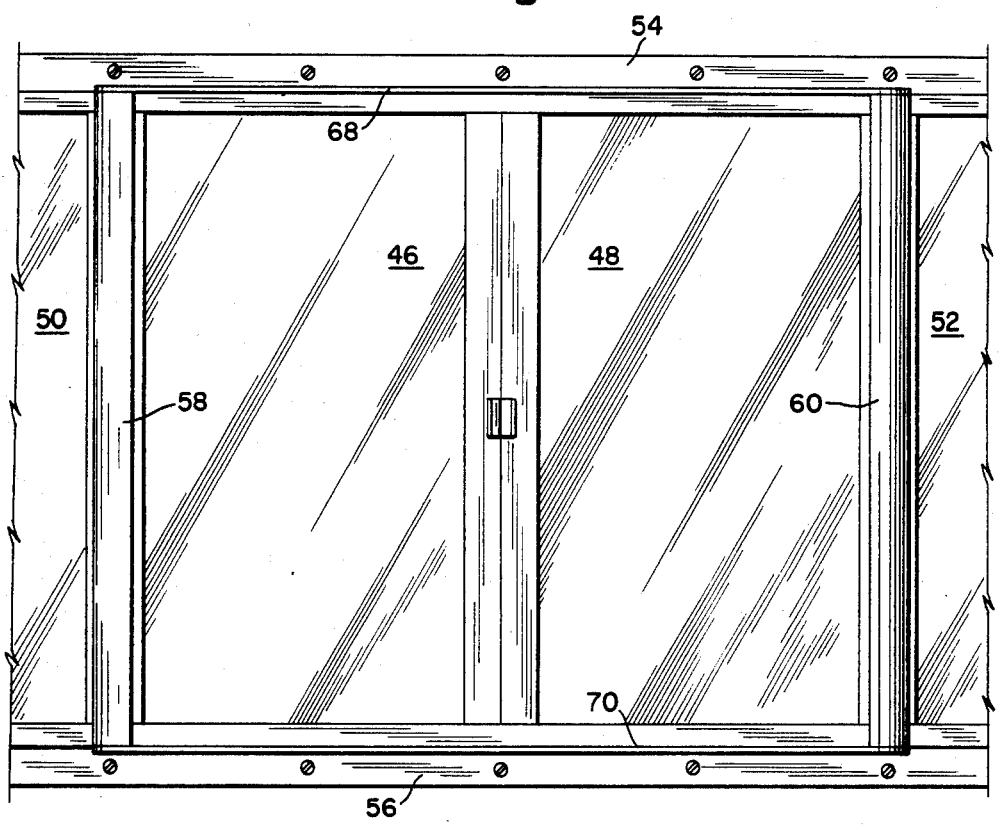
FIG. 6 is an elevation view of another embodiment of the end securement frame of this invention installed as an integral part of an otherwise conventional slider window assembly, which is partially shown.
Figure 9:
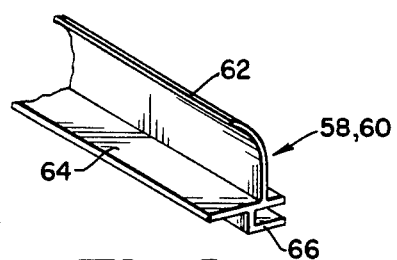
FIG. 9 is a partial, perspective view of the stock material of this invention which includes a channel portion in the shape of an inverted J.
Figure 10:
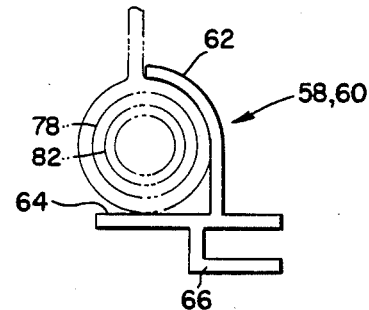
FIG. 10 is an end view of a channel member as illustrated in FIG. 9 and showing a portion of a window boot semi-rigid end installed therewithin, the window boot end being shown in chain-dot lines.

Turning now to FIGS. 6-10, a second embodiment of the invention will be discussed which is particularly suited for the original equipment market. With reference to FIG. 6, otherwise conventional components of a slider window are illustrated, including sliding panes 46 and 48, fixed glass sections 50 and 52 and upper and lower window frame moldings 54 and 56, respectively. The conventional U-shaped edge moldings at the inner ends of fixed glass panes 50 and 52 are replaced by channels 58 and 60, having opposed openings therealong. As shown in FIG. 9, each channel 58, 60 is formed from a length of stock material including an upper member 62 in the configuration of an inverted J with a base web 64. Integral therewith is a lower piece 66 which, with web 64, forms an open, cap U-shaped channel for receiving the edge of a fixed glass pane of a slider window.

Figure 7:
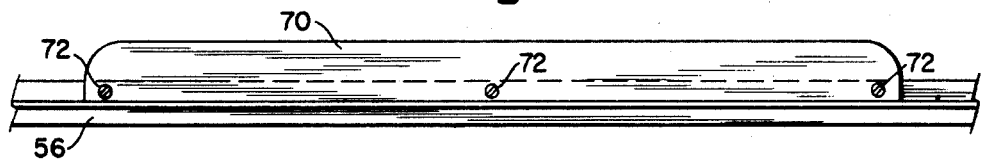
FIG. 7 is an end elevation view of the embodiment of the invention illustrated in FIG. 6.
Figure 8:
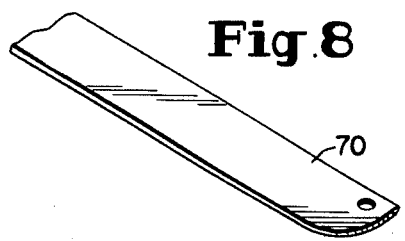
FIG. 8 is a partial, perspective view of the lower shelf of the embodiment of the invention illustrated in FIGS. 6 and 7.

The upper and lower ends of the channels 58 and 60 are joined by an upper, weather cap or ledge 68 and a lower shelf 70, respectively. As shown in FIG. 7, shelf 70 is attached to molding 56 by conventional means, such as screws 72. Upper shelf 68 is secured to molding 54 in a similar manner. The outer edges of each piece 68,70 are gently curved to match the ends of the channel openings of channels 58 and 60. This is clearly illustrated in FIGS. 7 and 8.

Figure 11:
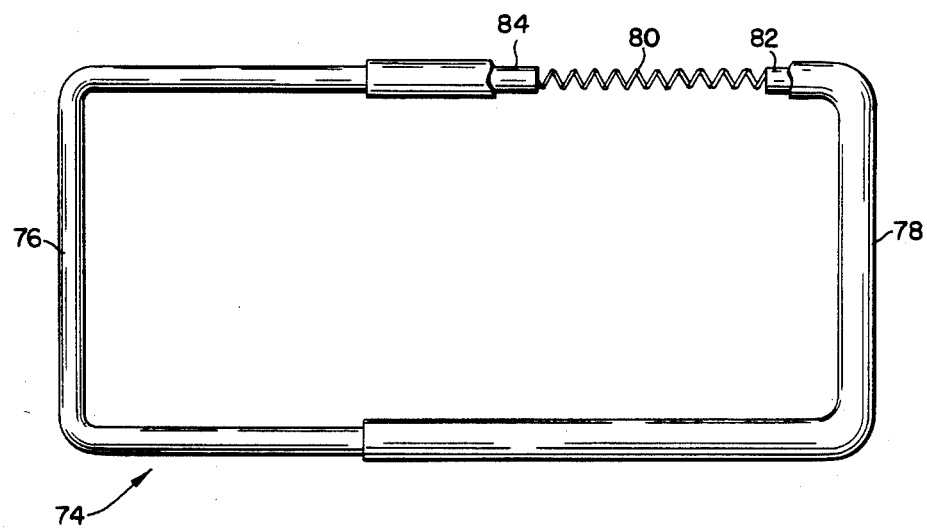
FIG. 11 is a plan view of the semi-rigid end of a window boot installed as shown in FIG. 10, and with parts broken away to show interior detail.

Referring now to FIG. 11, the interior structure of a semi-rigid end 74 of window boot 14 will be discussed. End 74 is encased within flexible materials which forms window boot 14; the material is wrapped about the end 74 and then sealed or stitched back upon itself. Preferably, the flexible material forming boot 14 is made of a plastics material such as vinyl.

Window boot end 74 is made of a pair of U-shaped members 76,78, the member 78 having open ends to which the ends of member 76 are telescopically fitted; thus the members 76,78 may be urged together and apart by reason of the sliding interfitment of one member with respect to the other. As shown in the upper right-hand portion of FIG. 11, a spring 80 is inserted within a leg of member 78 between a plug 82 and leg end 84. The lower, horizontal portion of window boot end 74 is similarly, internally constructed. Thus, it can be readily appreciated that the end 74 may be compressed for installation simply by grasping the vertical ends of members 76 and 78 and urging the same together. After installation, the springs will force the vertical ends 76 and 78 into the channels of the frame of this invention. With respect to the second embodiment, this installation is indicated in the detail view of FIG. 10. With respect to the first embodiment of the invention, the members 76 and 78 are compressed sufficiently together so as to clear the inner edges of the segments 34 (FIG. 3) whereupon the ends are allowed to expand and be seated beneath channels 30 and 32.

The invention may be embodied in other specific forms without departing from the spirit or essential characteristics thereof. The present embodiments are therefore to be considered in all respects as illustrative and not restrictive, the scope of the invention being indicated by the appended claims rather than the foregoing description, and all changes which come within the meaning and range of equivalency of the claims are therefore intended to be embraced therein.

We claim:

1. Means for securing an end of a sealing means or boot installed between adjacent window openings in the cab of a vehicle and a component mounted on the vehicle such as a camper, cap or canopy, said securing means comprising: a frame assembly mounted on the exterior of at least one of the window openings, said frame assembly including a pair of opposed channels each having means defining an elongate opening therealong, the openings of said channels facing one another and configured to receive a boot end therein and retain the boot end in generally sealing relationship with the periphery of the window opening.

2. The securing means as claimed in claim 1 wherein said channels include upper and lower ends, there further being hood means, interconnecting said channel upper ends, for forming an upper weather seal over the upper portion of a window boot end, and shelf means, interconnecting said channel lower ends, for forming a lower weather seal beneath the lower portion of a window boot end.

3. The securing means as claimed in claim 1 wherein each said channel is inversely J-shaped in cross-section.

4. The securing means as claimed in claim 3 wherein each said channel, in plan view, further comprises upper and lower segments directed toward one another and including inwardly open portions for retaining corners of a window boot end therewithin.

5. The securing means as claimed in claim 2 wherein said securing means is of one-piece construction.

6. The securing means as claimed in claim 2 wherein said pairs of channels replace otherwise conventional vertical frame ends of a conventional slider window.

7. The securing means as claimed in claim 6 wherein each said channel includes an integral, elongate web defining a lower, inner portion of the opening thereof.

8. For use in construction of opposed channels for retaining an end of a sealing means or boot installed between adjacent window openings in the cab of a vehicle and a component mounted on the vehicle such as a camper, cap or canopy, an indefinite length of stock material which, in cross-section, includes a portion in the form of an inverted J, a flat base web portion at the lower, terminal end of the inverted J portion, and means defining a U-shaped slot on the base web on a side thereof opposite the inverted J portion, said J portion, web and U-shaped slot being integral.

9. In combination, a sealing means or boot for use between adjacent window or passageway openings in the cab of a vehicle and a component mounted on the vehicle such as a camper, cap or canopy; said boot comprising a tunnel of relatively flexible, material terminating in opposed ends and retention means at at least one of said opposed ends, said retention means being substantially quadrilateral in configuration and including a first pair of opposed legs joined by a pair of opposed, inwardly compressible legs spring urged to an expanded state; and means for securing said boot end retention means on a cab or component window opening in generally sealed relationship therewith, said securing means comprising a frame assembly including a pair of opposed channels each having means defining an elongate opening therealong, the openings of said channels facing one another and configured to receive opposed sides of said window boot end retention means therewithin.

* * * * *